United States Patent
Tsai et al.

(10) Patent No.: US 6,603,514 B1
(45) Date of Patent: Aug. 5, 2003

(54) FOCUS CONTROLLING METHOD AND SYSTEM BY EVALUATING A RESOLUTION INDEX

(75) Inventors: Jenn-Tsair Tsai, Taipei (TW); Te-Chih Chang, Hsinchu (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/236,555

(22) Filed: Jan. 26, 1999

(51) Int. Cl.$^7$ .................. G03B 13/00; H04N 5/232
(52) U.S. Cl. .................. 348/345; 355/60; 358/482; 358/513
(58) Field of Search ............... 358/513, 482; 355/58, 60; 348/345

(56) References Cited

U.S. PATENT DOCUMENTS

| | | | |
|---|---|---|---|
| 4,557,593 A | * 12/1985 | Iwanade | 355/57 |
| 5,307,175 A | * 4/1994 | Seachman | 348/241 |
| 5,402,225 A | * 3/1995 | Stubbs et al. | 283/115 |
| 5,535,040 A | * 7/1996 | Ohtsuka et al. | 250/234 |
| 5,633,745 A | * 5/1997 | Chen et al. | 358/474 |
| 5,793,482 A | * 8/1998 | Tseng et al. | 250/201.4 |
| 6,169,622 B1 | * 1/2001 | Tsai et al. | 358/474 |
| 6,222,934 B1 | * 4/2001 | Tsai | 358/504 |
| 6,252,998 B1 | * 6/2001 | Tsai | 382/295 |

OTHER PUBLICATIONS

RD 256026 A Feb. 1988.*

* cited by examiner

Primary Examiner—Vincent Boccio
Assistant Examiner—Eric Wisdahl

(57) ABSTRACT

The focus controlling system of the present invention can include a calibration paper, an image capturing device, an input interface, and a processing and controlling device. One or more calibration papers can be employed in the focus controlling system. The image capturing device is employed for scanning the calibration paper. The image capturing device has a focus point adjusting mechanism. The input interface is utilized for receiving a location data of a scanning point. The processing and controlling device is responsive to the input interface and the image capturing device to control the focus point adjusting mechanism by evaluating a resolution index. As an example, the image capturing system can be a flatbed scanning system.

One of the focus controlling method of the present invention includes the steps as follows. At first, a scanning point is set or detected and the position of an image capturing device is adjusted to scan a selected calibration paper of two or more calibration papers. The selected calibration paper has about the same height as the scanning point. A focus point of a image capturing device is adjusted and a calibration paper is scanned to generate a resolution index. The adjusting step and the scanning step are then repeated until about a maximum value of the resolution index is reached.

22 Claims, 7 Drawing Sheets

FOCUS CONTROLLING METHOD AND SYSTEM BY EVALUATING A RESOLUTION INDEX

CROSS REFERENCE TO RELATED APPLICATIONS

This invention is related to co-filed U.S. patent application entitled "A FOCUS CONTROLLING METHOD AND SYSTEM FOR AN IMAGE CAPTURING SYSTEM" assigned to same assignee with a common inventor as the present application and incorporated herein by reference in their entirety.

FIELD OF THE INVENTION

The present invention relates to a focus controlling method and system, and more specifically, to a focus controlling system for an image capturing system by evaluating a resolution index.

BACKGROUND OF THE INVENTION

An image capturing system like a scanning system is an image processing tool which is popularly employed for acquiring the image of documents, photographs, or even objects. The image is acquired and then transferred to an accessible signal or data for a processor or a computer. Without limiting the scope and application of the present invention, the operation of a scanner is illustrated as follows. In general, the document is illuminated by a light source when being scanned. The image is then transferred onto image or photo sensing devices through one or a set of lenses. Generally speaking, the photo sensing devices like CCD (charge-coupled device), CIS (contact image sensor), or photo-sensitive MOS (metal oxide semiconductor) devices, can be employed. The photo sensing devices can transform the image to accessible signals. In general, the scanning systems can generally be classified to at least three categories by its operation characteristics, including a hand-hold scanning system, a sheet feeding scanning system, and a flatbed scanning system.

For achieving the high quality of the image being captured, a flatbed scanning system is used frequently. FIG. 1 illustrates a schematic side view of a portion of a flatbed scanning system. In the application of the flatbed scanning system, a document or an object being scanned 10 is placed on a transparent plate 12. An image capturing device 14 is moved under the transparent plate 12 to capture the image of the document 10 line-by-line. The quality of the image acquired is greatly dependent on the characteristics of the image capturing device 14. The parameters like resolution and depth of focus (DOF) have a great influence on the quality of the image transferred.

Under the raised requirement of image quality and the increasing processing ability of related processors or computers, the resolution of the scanner is significantly raised to capture high quality images. In general, the depth of focus of the image capturing device 14 is quite limited, especially for high resolution scanning systems. However, in most of the image capturing applications, some documents 10 are covered with a document wrapper or transparent shield 10a, as shown in FIG. 2. The insertion of the transparent shield 10a between the document 10 and the image capturing device 14 increases the distance between the two. The optical path between the object being scanned and the lens of the optical system is then changed. If the focus point, or namely the length of the optical path, of the image capturing device 14 is remained unchanged, the magnification ratio and the resolution would be varied under the increased object distance. The change of magnification ratio on the scanned width might cause the captured image to be distorted in size or the length-to-width ratio. Besides, the object being scanned can be left outside the range of designed depth of focus, the resolution and clearness of the image is greatly influenced. The image quality is then damaged under the shifted focus point.

For most of the image scanning devices, the focus point of the object being scanned is fixed. For high resolution scanning systems, the depth of focus is generally very short and the tolerance to the variation in the document height is extremely tight. However, lots of document are scanned in accompanying with a document wrapper with a considerable thickness. The object distance of the document 10 from the image capturing device 14 is increased. In order to adapt for the change in document heights, an improved scanning system must be provided with adaptive focus controlling system. Therefore, the magnification ratio and the resolution of the scanning process can be adjusted and the quality of the image captured can be maintained.

SUMMARY OF THE INVENTION

The present invention discloses a focus controlling method and system for an image capturing system to control to the focus point by evaluating a resolution index. The length of the optical path between the scanned object and the lens of the image capturing device can be controlled. Under the variation in the position of the scanned object, the resolution of the system can be controlled or maintained within a tolerable range through a closed loop control method and system. The change of the magnification ratio under varied object height can also be compensated.

The focus controlling system of the present invention can include a calibration paper, an image capturing device, an input interface, and a processing and controlling device. One or more calibration papers can be employed in the focus controlling system. The image capturing device is employed for scanning the calibration paper. The image capturing device has a focus point adjusting mechanism. The input interface is utilized for receiving a location data of a scanning point, either by setting or detection. The processing and controlling device is responsive to the input interface and the image capturing device to control the focus point adjusting mechanism by evaluating a resolution index. As an example, the image capturing system can be a flatbed scanning system.

In the first embodiment of the present invention, two or more calibration papers can be placed on different heights over a surface of a document plate of the scanning system. In the first embodiment, the processing and controlling device adjusts the focus point, in order to have about the maximum value of the resolution index. The resolution index is the one for a selected calibration paper of the calibration papers, wherein the selected calibration paper has about the same height as the scanning point.

In the second embodiment of the present invention, the focus controlling system can further include a data converting device for providing a targeting resolution index for the scanning point. In the second embodiment, the processing and controlling device adjusts the focus point, in order to have the resolution index to be about the value of the targeting resolution index.

The first embodiment of the focus controlling method of the present invention includes the steps as follows. At first, a scanning point is set or detected and the position of an image capturing device is adjusted to scan a selected calibration paper of two or more calibration papers. The selected calibration paper has about the same height as the scanning point. A focus point of a image capturing device is adjusted and a calibration paper is scanned to generate a resolution index. The adjusting step and the scanning step are then repeated until about a maximum value of the resolution index is reached.

The second embodiment of the focus controlling method of the present invention includes the steps as follows. At first, a scanning point is set or detected and a target resolution index for the scanning point is generated. A focus point of a image capturing device is adjusted and a calibration paper is scanned to generate a resolution index. The adjusting step and the scanning step are then repeated until the resolution index of the focus point is about the value of the targeting resolution index.

BRIEF DESCRIPTION OF THE DRAWINGS

The foregoing aspects and many of the attendant advantages of this invention will become more readily appreciated as the same becomes better understood by referencing the following detailed description, when taken in conjunction with the accompanying drawings as follows.

DETAILED DESCRIPTION OF THE PREFERRED EMBODIMENTS

The present invention discloses a focus controlling method and system for an image capturing system to control to the focus point by evaluating a resolution index. The length of the optical path between the scanned object and the lens of the image capturing device can be controlled. With the adaptive control on the focus point of a image capturing device, the resolution of the system can be controlled through a closed loop control method and system in the present invention. Under the variation in the position of the object being scanned, the change of the magnification ratio can also be compensated.

Figure 1:
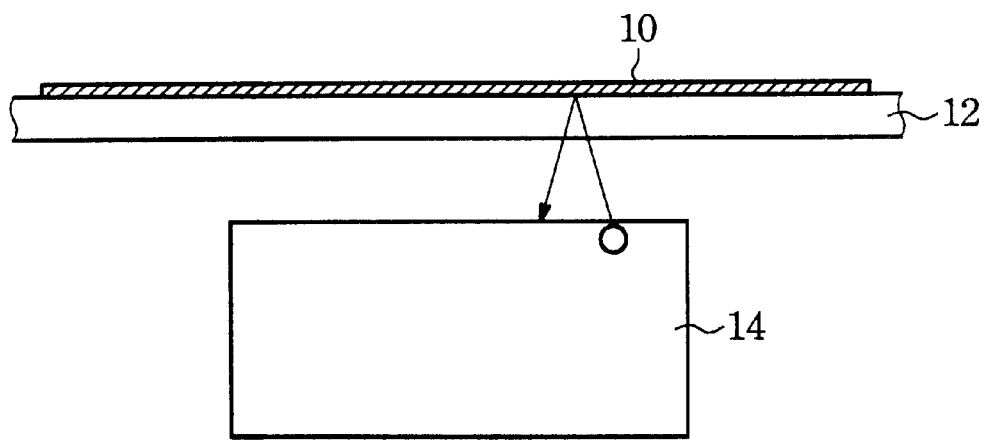
FIG. 1 illustrates a schematic side view of a portion of a prior art flatbed scanning system.
Figure 2:
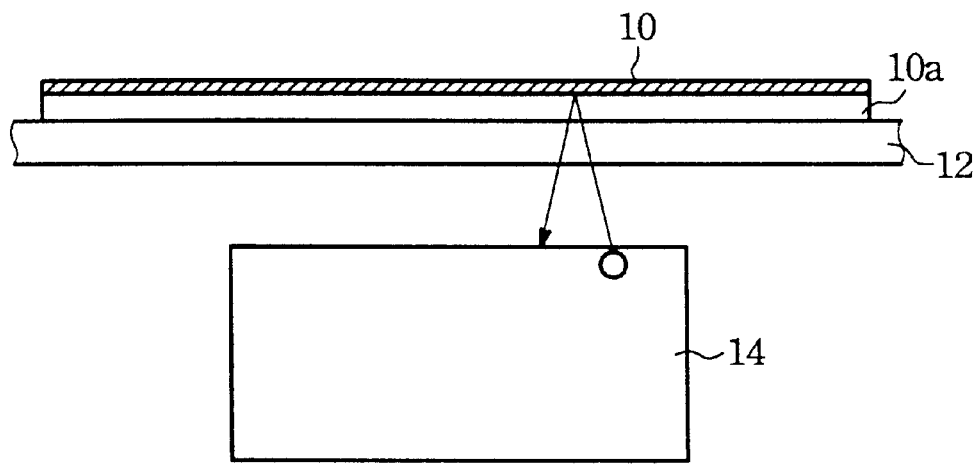
FIG. 2 illustrates a schematic side view of a document with a document wrapper placed in a prior art flatbed scanning system.
Figure 3:
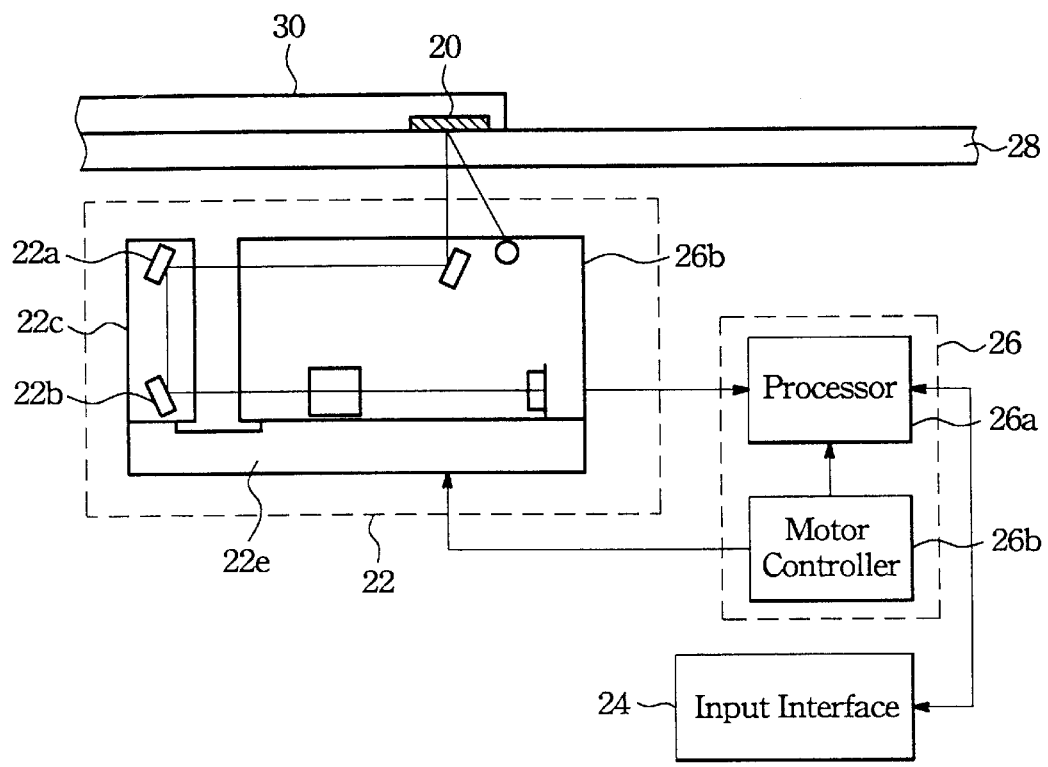
FIG. 3 illustrates a schematic side view of a focus controlling system in accordance with the present invention.

Referring to FIG. 3, a schematic side view of the focus controlling system in the present invention is illustrated with related functional blocks. The focus controlling system for an image capturing system can include a calibration paper 20, an image capturing device 22, an input interface 24, and a processing and controlling device 26. Without limiting the scope and application of the present invention, a flatbed scanning system is employed solely as an illustrative example of the present invention. Upon acknowledging the spirit of the present invention, skill artisans can apply the focus controlling method and system in other kinds of image capturing system without further indication of embodiments.

Figure 4:
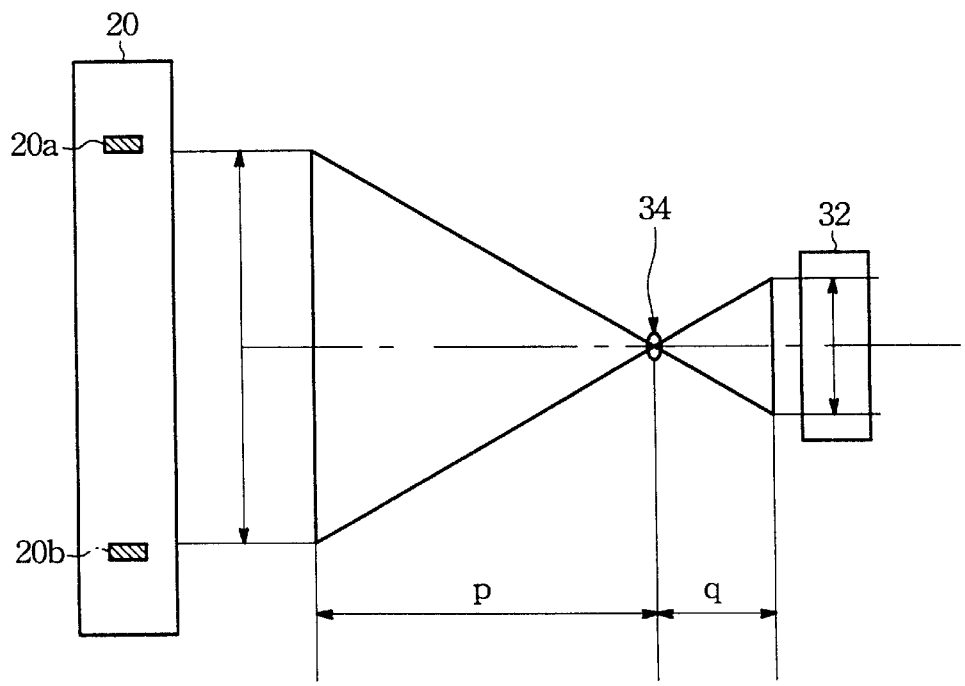
FIG. 4 illustrates a schematic diagram of the optical path of a scanning system and a calibration paper having resolution patterns in accordance with the present invention.

In a flatbed scanning system, a transparent plate or glass 28 is used for being placed with the object being scanned, like documents, photographs, or even objects. In the case, the calibration paper 20 can be attached to a surface of the document plate 28 of the scanning system. The calibration paper 20 can be embedded into a housing 30 located on the peripheral area of the document plate 28. For achieving the focus point correction purpose of the present invention, the calibration paper 20 has resolution patterns formed over. The resolution patterns can be line patterns with parallel lines. The line patterns are arranged in parallel with a specified inclined angle to a scanning line. An example of the resolution pattern is illustrated in FIG. 4 with parallel lines perpendicular to the scanning line. The pitch between each parallel line and the inclined angle can be adjusted with the design need and the resolution of the scanning system.

Turning to FIG. 3, the image capturing device 22 is utilized in the scanning system for capturing an image as well as scanning the calibration paper 20. For controlling the focus point, the image capturing device 22 has a focus point adjusting mechanism. In the preferred embodiments, the image capturing device 22 can have one or more movable reflecting mirrors. The focus point can then be varied through the movements of the reflecting mirror or mirrors. In the case, the image capturing system 22 includes two movable reflecting mirrors 22a and 22b. The reflecting mirrors 22a and 22b can be attached to a mirror box 22c. The box 22c can be moved in relative to the image capturing portion 22d of the image capturing device 22, by the driving of a moving mechanism 22e. In the case, a driving motor like a stepping motor can be included in the moving mechanism 22e to move the box 22c. Therefore, the object distance, namely the length of the optical path between the object being scanned and the lens of the image capturing device 22, can be varied to adjust the focus point and the resolution of the system.

Figure 5A:
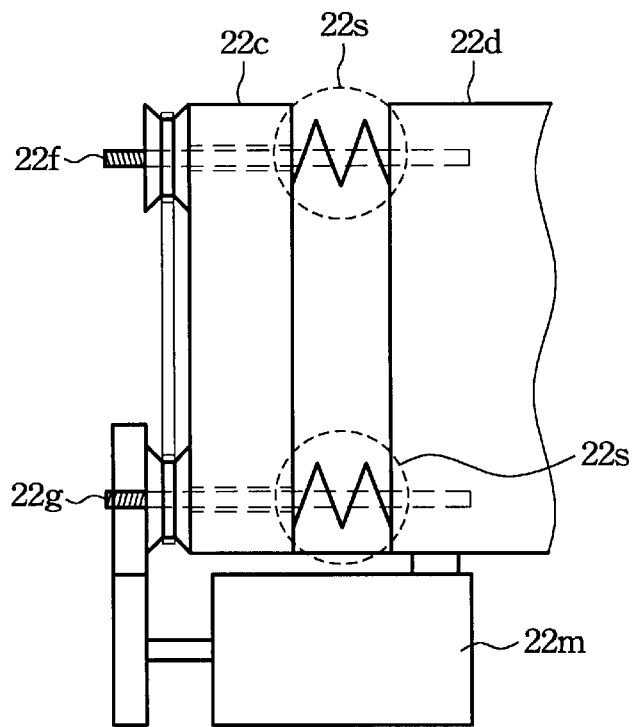
FIG. 5a illustrates a pulley-screw type moving mechanism for the image capturing device in accordance with the present invention.

Various kinds of moving mechanisms can be employed to drive the mirror box 22c to move in relative to the image capturing portion 22d. Referring to FIG. 5a, a pulley-screw type moving mechanism can be used. The mirror box 22c can be moved in relative to the image capturing portion 22d through the rotation of two parallel screw rods 22f and 22g. Flexible devices like springs 22s can be inserted between mirror box 22c and the image capturing portion 22d. The screw rods 22f and 22g can be driven by the motor 22m with a belt and pulley mechanism.

Figure 5B:
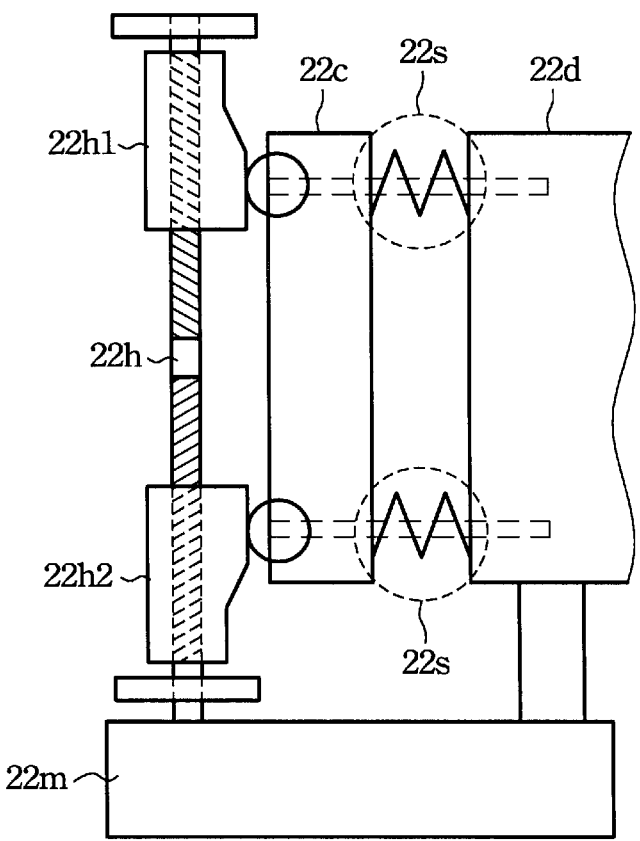
FIG. 5b illustrates a slide-screw type moving mechanism for the image capturing device in accordance with the present invention.

Another example of moving mechanism is illustrated in FIG. 5b as a slide-screw type. A screw rod 22h located aside the mirror box 22c can be driven directly by the motor 22m. Two sliding blocks 22h1 and 22h2 can be moved by the rotating screw rod 22h. The position of the mirror box 22c in relative to the image capturing portion 22d can be controlled by relating the position of the mirror box 22c to the profile variation on the sliding blocks 22h1 and 22h2, by contacting through bearings like wheels or rotatable balls. In the same way, the flexible devices like springs 22s can be inserted between the mirror box 22c and the image capturing portion 22d.

Figure 5C:
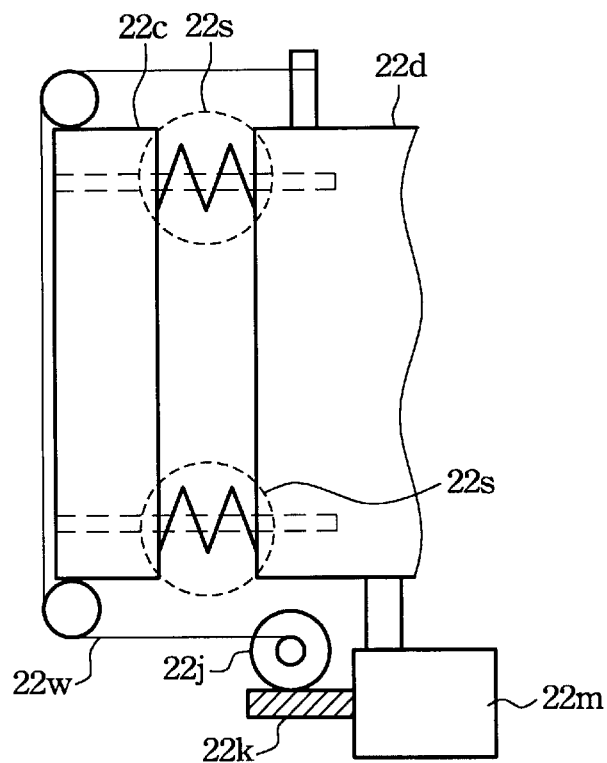
FIG. 5c illustrates a wire-worm type moving mechanism for the image capturing device in accordance with the present invention.

In FIG. 5c, a wire-worm type moving mechanism is shown. Same as above, the flexible devices like springs 22s can be inserted between the mirror box 22c and the image capturing portion 22d. The relative position between the mirror box 22c and the image capturing portion 22d can be constrained and controlled by the length of a wire 22w. The length of the wire 22w is adjusted by a winding wheel 22j, which can be driven by the motor 22m through a worm rod 22k.

Figure 5D:
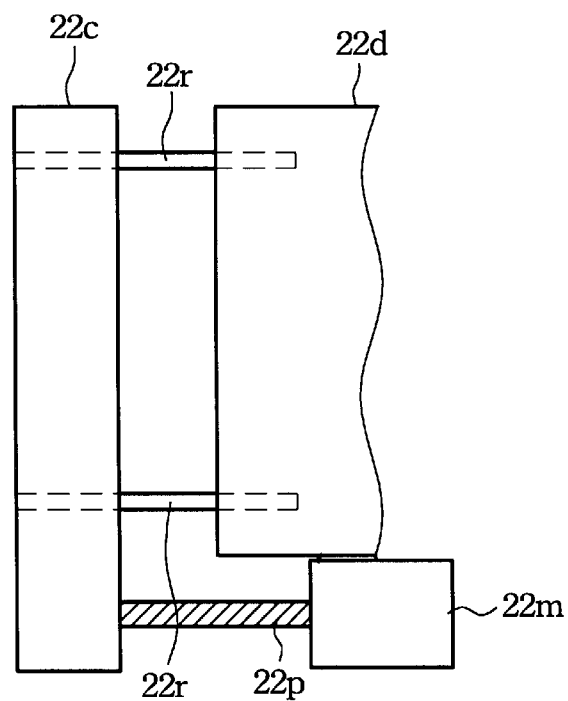
FIG. 5d illustrates a screw-driving mechanism for the image capturing device in accordance with the present invention.

A fourth type of the moving mechanism is illustrated in FIG. 5d. In the screw-driving type moving mechanism, the mirror box 22c can be moved in relative to the image capturing portion 22d through the rotation of the screw rod 22p, under the driving of the motor 22m. One or more guiding rails like the rails 22r shown in the figure can be employed to guide the motion of the mirror box 22c. Therefore, with the operation of the screw rod 22p and the motor, the focus point can be controlled. In addition, various kind of image sensing elements, like CCD (charge-coupled device), CIS (contact image sensor), or photo-sensitive MOS (metal oxide semiconductor) transistors, can be employed in the image capturing device 22. In the case, charge-coupled devices can be utilized in the image capturing device 22 for capturing the image being scanned.

Turning to FIG. 3, the input interface 24 is an interface device for receiving a location data of a scanning point. In general, the input interface 24 can be a processing system which is connected with the scanning system. As an example, a computer for controlling the operation of the scanner and processing the image signal can be the input interface 24. Under the variation in the raised object height, the variation of the location of the scanning point can be inputted from the input interface 24. In general, the value of the raised object height can be determined from the type or thickness of document wrappers used on the document being scanned. A built-in menu with several frequently-employed height can also be set within the interface 24. The user can directly select the listed items of heights without the effort in measuring and re-entering the numbers. Besides, the height variation of the document can also be detected by the system by detecting the actual location of the document surface. The detected value is then received by the interface 24. Therefore, the focus controlling system can adjust the focus point or the scanning point according to the specified variation in the object location. In the case, the scanning point can be set or detected as a raised height of an object being scanned, in compared with the standard height of putting the object directly on the document plate 28. As a consequence, the raised height can be set or detected as about the thickness of the document wrapper covering over the scanned document, by which the object height is increased.

In the focus controlling system, the processing and controlling device 26 is responsive to the input interface 24 and the image capturing system 22 to control the adjustment in the focus point. In the case, the processing and controlling device 26 can include a processor 26a and a motor controller 26b. The processor 26a can have accompanying memories for processing and calculating data. Besides, the processor 26a can be implemented with the processing resource of the computer connecting to the scanning system. Therefore, the hardware design and cost of the scanning system can be reduced.

Referring to FIG. 4, a schematic diagram of the optical path in an image capturing device of the present invention is illustrated. For adjusting the focus point, the calibration paper 20 is scanned. The scanned image is transferred to an image 32 through a lens set 34. An object distance p is the distance between the object being scanned, or the calibration paper 20 in the case, and the lens 34. A image distance is the distance between the lens 34 and the projected image 32. For the scanning system as shown in the figure, the magnification ratio m of the system is $$m=p/q$$

Figure 6:
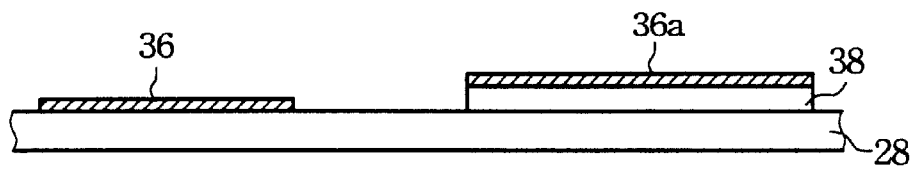
FIG. 6 illustrates a schematic side view of documents with and without a document wrapper placed on a flatbed scanning system in accordance with the present invention.

If a document 36 is placed directly on the document plate 28 as shown in FIG. 6, the magnification ratio m can be kept with the prescribed value. The image can be acquired correctly under the designed depth of focus and resolution range. However, if a document 36a is placed onto the document plate 28 with a document wrapper 38 in-between, the object distance is increased with the raised height x, namely the thickness of the document wrapper 38. In the prior art scanning system, the focus point is fixed and the increased object distance of p+x would result in a raised magnification ratio. The raised magnification ratio m'=(p+x)/q. In addition, the document 36a might located out of the focus point and the depth of focus. The image quality is then damaged under a distorted magnification ratio and a reduced resolution.

In order to compensate for the increased object height x, the object distance p of the lens 34 to the calibration paper 20 should be reduced with the same amount x. The method of adjusting the focus point to compensate for the increased object distance can be performed with the two embodiments as follows.

Figure 7:
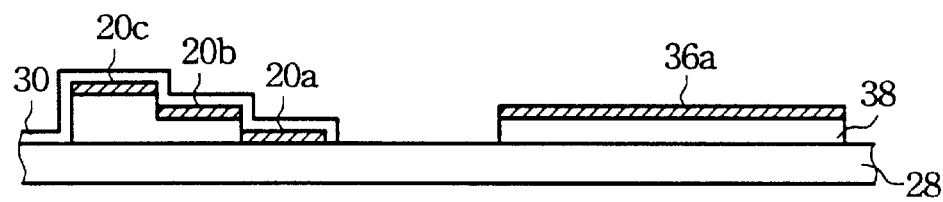
FIG. 7 illustrates a schematic side view of calibration papers placed at different heights over a document plate in accordance with the present invention.

In the first embodiment, two or more calibration papers can be included in the scanning system. As an example, three calibration papers can be included in the focus controlling system, as shown in FIG. 7. Three calibration papers 20a, 20b, and 20c are placed at different heights over a surface of a document plate 28 of the scanning system. In the case, the calibration papers 20a, 20b, and 20c can be embedded into a housing 30 located on the peripheral area of the document plate 28. Alternatively, the calibration papers can also be placed directly onto the glass 28 when it is needed. If a scanning point is given, the processing and controlling device 26 can adjust the focus point of the image capturing device 22. One of the calibration papers can be selected with the one having about the height of the scanning point. For example, if the document 36a is raised to about the height of the calibration paper 20b, under the insertion of the protective plate 38, the calibration paper 20b can be picked as the target of the adjust the focus point of the image capturing device 22. In the adjusting process, a resolution index, like a well known MTF (modulation transfer function) index, can be used as the a reference in finding a correct focus point with tolerable resolution. The focus point is adjusted to achieve a nearly optimized resolution for the selected calibration paper. The adjustment can be performed until an approximately maximum value of the resolution index, which is of the selected calibration paper having the nearest height to the scanned object, is reached. For increasing the accuracy or the range of the focus point adjustment, more calibration papers can be placed with different range of heights or variation steps.

Figure 8:
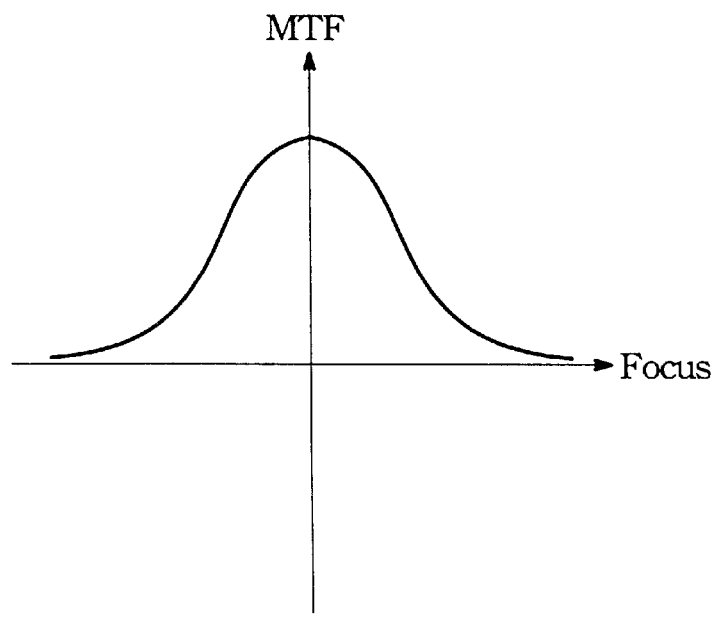
FIG. 8 illustrates an example of a correlation diagram between the focus point and the MTF value.

In the second embodiments of the present invention, only one calibration paper is needed in the scanning system, as shown in FIG. 3. For compensating the object height variation, the object distance p of the lens to the calibration paper 20 should be reduced with the same amount x. If the object distance of the lens 34 to the calibration paper 20 is reduced to p−x, the resolution in scanning the calibration paper 20 will be decreased. As an example, a well known MTF (modulation transfer function) index can be used as the resolution index in the case. For the calibration paper 20 with a fixed position, the MTF value will varied with the variation in the object distance under the adjusting of the focus point. In FIG. 8, an example of a MTF-focus correlation diagram is shown. Therefore, a table of the relation between the object distance and MTF value can be build for the scanning system. An example of the table in a scanning system with a resolution of about 600 DPI (dots per inch) is given as follows:

| Object distance | MTF value |
| --- | --- |
| p − 4n | 30 |
| p − 3n | 32 |
| p − 2n | 35 |
| p − n | 38 |
| p | 40 |
| p + n | 38 |
| p + 2n | 35 |
| p + 3n | 32 |
| p + 4n | 30 | wherein p is the standard object distance and n is the variation step. As an example, p can be 400 mm and n can be 0.1 mm. In the scanning system, a data converting device 27 can be further included for providing a targeting resolution index for a scanning point. For a given scanning point, the needed amount to reduce in the object distance is for compensating for the object height variation is known. If the raised height is x, the object distance to the calibration paper 20 is expected to reduce to p−x. For the reduced object distance, a targeting MTF value can be converted from the given scanning point in the data converting device 27. Therefore, the processing and controlling device can adjust the focus point to have a resolution index which is nearly equal to the targeting resolution index and the height can then be compensated with the adjusted focus point. The correct magnification ratio and an optimized can be acquired for the object being scanned at the raised height.

Figure 9:
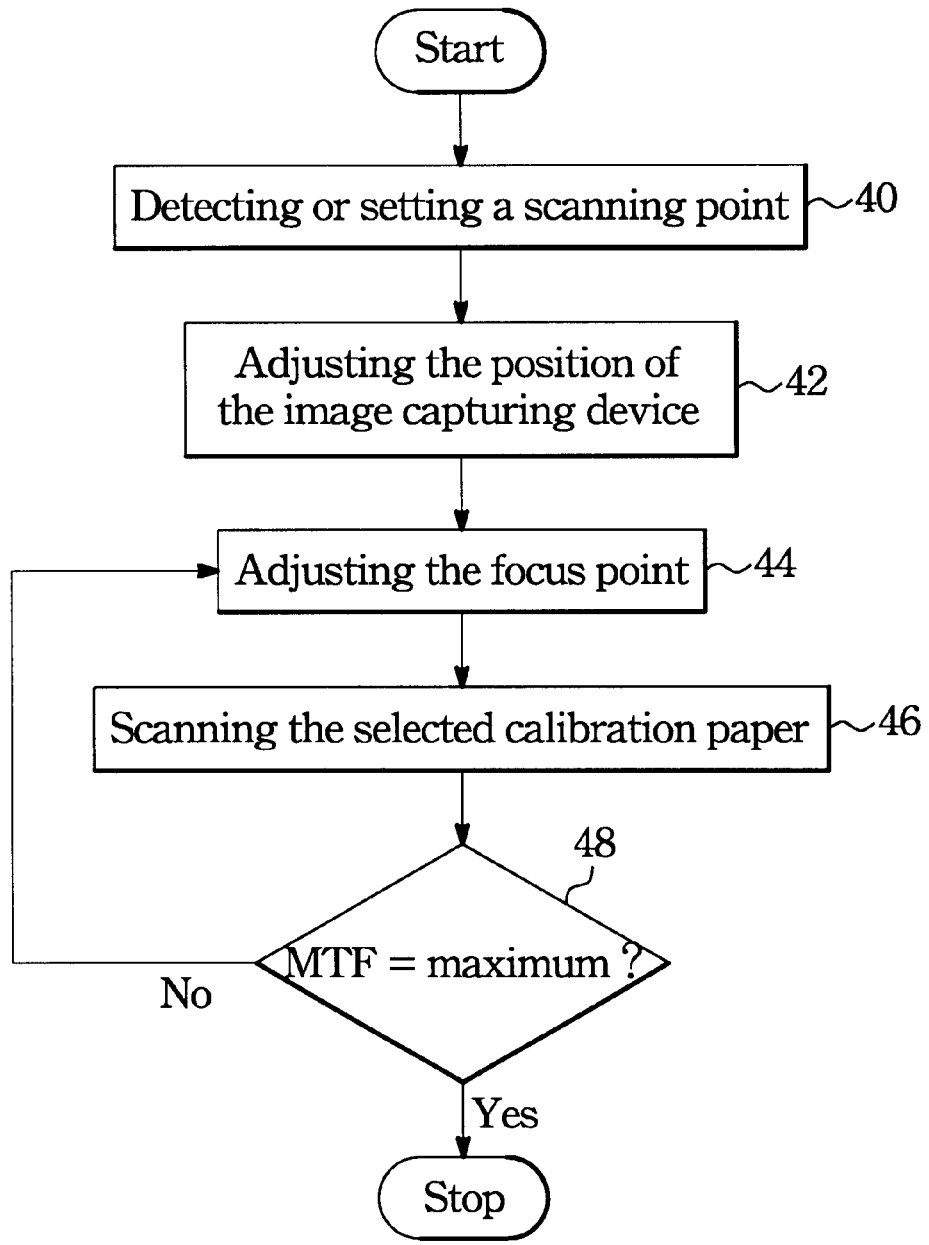
FIG. 9 illustrates a schematic flowing diagram of the first embodiment of the focus controlling method in accordance with the present invention.

Referring to FIG. 9, a schematic flowing diagram of the first embodiment of the focus controlling method in the present invention is shown. At first, a step 40 of setting a scanning point is performed. A location of the scanning point can be set as a raised height x of an object being scanned. The raised height can be set through the input interface 24 in FIG. 3. In the step 42 of FIG. 9, the position of the image capturing device is adjusted to scan one of the calibration papers which has about the height of the scanning point. Referring to FIG. 7, the position of the image capturing device can be moved in parallel to the document plate 28. In the step 44 of FIG. 9, the focus point of the image capturing device is adjusted. As an example, the focus point can be adjusted using one or more movable reflecting mirrors, which can be driven by the moving mechanism 22e described above. Next, the selected calibration paper is scanned in the step 46 to generate a resolution index. In the case, a modulation transformation function (MTF) can be used. The resolution index can be generated by the processing and controlling device 26 in FIG. 3, by processing the signal of the scanned image.

Finally, the adjusting step 44 and the scanning step 46 are repeated until a nearly optimized resolution, namely when the MTF value is at about its maximum, is achieved. The repetition can be performed with the judgement step 48. If the MTF value is increasing and the maximum value is not yet reached, the adjusting step 44 and the scanning step 46 are repeated until the about maximum value is reached. If the present MTF value is about the maximum value, the process of adjusting the focus is finished and stopped. However, if the MTF value with the modified focus point has a decreasing trend, the focus point is adjusted in a reversed direction to find the point with nearly maximum value.

Figure 10:
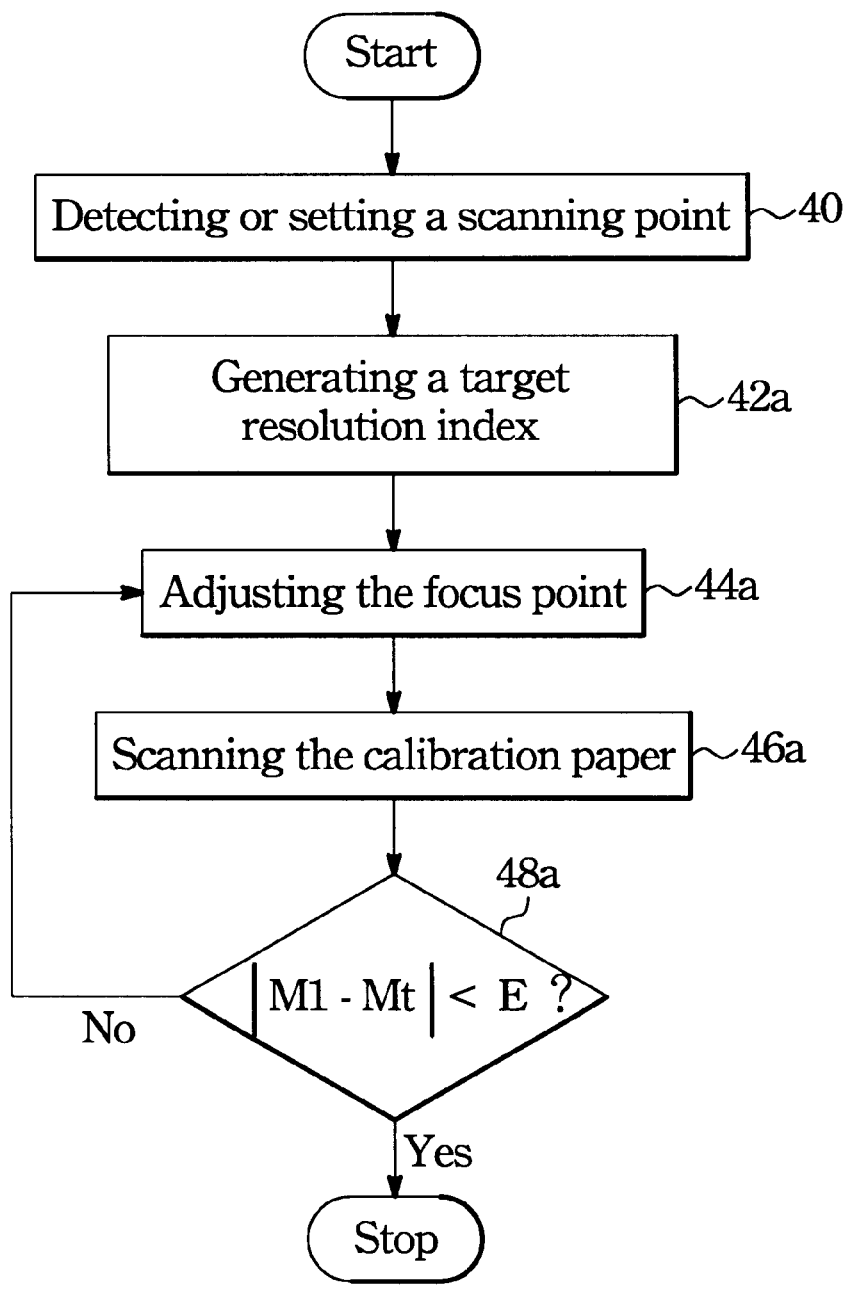
FIG. 10 illustrates a schematic flowing diagram of the second embodiment of the focus controlling method in accordance with the present invention.

Referring to FIG. 10, a schematic flowing diagram of the second embodiment of the focus controlling method in the present invention is shown. At first, a step 40a of setting a scanning point is performed. A location of the scanning point can be set as a raised height x of an object being scanned. The raised height can be set through the input interface 24 in FIG. 3. In the step 42a of FIG. 10, a target resolution index for the scanning point is generated. The corresponding value for the target resolution index can be generated from the data converting device in FIG. 3 from the given scanning point, as what disclosed above. In the step 44a of FIG. 9, the focus point of the image capturing device is adjusted. As an example, the focus point can be adjusted using one or more movable reflecting mirrors, which can be driven by the moving mechanism 22e described above. Next, the calibration paper is scanned in the step 46a to generate a resolution index. In the case, a modulation transformation function (MTF) can be used. The resolution index can be generated by the processing and controlling device 26 in FIG. 3, by processing the signal of the scanned image.

Finally, the adjusting step 44a and the scanning step 46a are repeated until the resolution index M1 of the focus point is about the value of the targeting resolution index Mt. The repetition can be performed with the judgement step 48a. If the difference between the resolution index M1 and the targeting resolution index Mt is smaller than a tolerable criteria E, the process of adjusting the focus is finished and stopped. If the difference between the resolution index M1 and the targeting resolution index Mt is not small enough, the adjusting step 44a and the scanning step 46a are repeated until the resolution index M1 is approximately equal to the targeting resolution index Mt.

Therefore, after the focus point is adjusted, the raised object height or increased object distance can be compensated with the shifted focus. The focus controlling method can be performed with either the first embodiment or the second embodiment illustrated above. Under the compensation by referencing the resolution index, the actual magnification ratio of scanning the object with changed position can be justified to about the designed value. The focus point is refocused onto the actual position of the object being scanned. The document can then be scanned with appropriated depth of focus and nearly optimized resolution. The quality of the scanned image can be raised greatly with the closed loop control method and system of the present invention.

As is understood by a person skilled in the art, the foregoing description of the preferred embodiment of the present invention is illustrative of the present invention rather than a limitation thereon. It is intended to cover various modifications and similar arrangements included within the spirit and scope of the appended claims. The scope of the claims should be accorded with the broadest interpretation so as to encompass all such modifications on the similar structure. While the preferred embodiment of the invention has been illustrated and described, it will be appreciated that various changes can be made therein without departing from the spirit and scope of the invention.

What is claimed is:

1. A focus controlling system of an image capturing system for scanning an original in a document wrapper on a document plate of the image capturing system, said focus controlling system comprising:

at least two calibration papers, having resolution patterns thereon, located on different heights above the surface of the document plate of the image capturing system;

an image capturing device for scanning a selected calibration paper of said at least two calibration papers to generate a resolution index, said image capturing device having a focus point adjusting mechanism;

an input interface for receiving a raised height of the original being scanned, said input interface having a menu of at least one document wrapper; and processing and controlling means being responsive to said input interface and said image capturing device to control said focus point adjusting mechanism by adjusting the resolution index to reach a maximum value.

2. The focus controlling system of claim 1, wherein said resolution patterns comprises line patterns.

3. The focus controlling system of claim 1, wherein said image capturing device comprises at least one movable reflecting mirror for adjusting a focus point.

4. The focus controlling system of claim 1, wherein said image capturing device comprises two movable reflecting mirrors driven by said focus point adjusting mechanism.

5. The focus controlling system of claim 1, wherein said focus point adjusting mechanism is selected from the group consisting of a pulley-screw type, a slide-screw type, a wire-worm type, and a wire-screw type moving mechanism.

6. The focus controlling system of claim 1, wherein said processing and controlling means comprises a processor and a motor controller.

7. The focus controlling system of claim 1, wherein said resolution index comprises a modulation transfer function (MTF) index.

8. A focus controlling method for scanning an original in a document wrapper on a document plate of an image capturing system, said focus controlling method comprising:

setting a raised height of the original being scanned;

adjusting a position of an image capturing device to scan a selected calibration paper of at least two calibration papers, a height of said selected calibration paper is about the same as the raised height of the original being scanned, said image capturing device having an input interface, said input interface having a menu of at least one document wrapper;

adjusting a focus point of said image capturing device according to the height of the selected calibration paper;

scanning said selected calibration paper to generate a resolution index; and repeating said adjusting step and said scanning step until said resolution index is about at a maximum value.

9. The focus controlling method of claim 8, wherein said at least two calibration paper have resolution patterns thereon.

10. The focus controlling method of claim 8, wherein said resolution index comprises a modulation transfer function (MTF) index.

11. The focus controlling method of claim 8, wherein said focus point is adjusted by moving at least one reflecting mirror of said image capturing device.

12. A focus controlling method for scanning an original in a document wrapper on a document plate of an image capturing system, said focus controlling method comprising:

setting a raised height of the original being scanned;

generating a target resolution index for compensating the raised height of the original being scanned;

adjusting a focus point of the image capturing device according to the target resolution index;

scanning a calibration paper to generate a resolution index; and repeating said adjusting step and said scanning step until said resolution index is about the same as said target resolution index.

13. The focus controlling method of claim 12, wherein said calibration paper is attached to a surface of the document plate of the image capturing system.

14. The focus controlling method of claim 12, wherein said calibration paper has resolution patterns thereon.

15. The focus controlling method of claim 12, wherein said resolution index comprises a modulation transfer function (MTF) index.

16. A focus controlling system of an image capturing system for scanning an original in a document wrapper on a document plate of the image capturing system, the focus controlling system comprising:

a calibration paper, having resolution patterns thereon, located on a surface of the document plate of the image capturing system;

an image capturing device for scanning the calibration paper to generate a resolution index, the image capturing device having a focus point adjusting mechanism;

an input interface for receiving a raised height of the original being scanned, said input interface having a menu of at least one document wrapper;

a data converting device for providing a target resolution index corresponding to the raised height of the original being scanned; and processing and controlling means being responsive to the input interface and the image capturing device to control the focus point adjusting mechanism by adjusting the resolution index to be about the same as the target resolution index.

17. The focus controlling system of claim 16, wherein the resolution patterns comprises line patterns.

18. The focus controlling system of claim 16, wherein the image capturing device comprises at least one movable reflecting mirror for adjusting a focus point.

19. The focus controlling system of claim 16, wherein the image capturing device comprises two movable reflecting mirrors driven by the focus point adjusting mechanism.

20. The focus controlling system of claim 16, wherein the focus point adjusting mechanism is selected from the group consisting of a pulley-screw type, a slide-screw type, a wire-worm type, and a wire-screw type moving mechanism.

21. The focus controlling system of claim 16, wherein the processing and controlling means comprises a processor and a motor controller.

22. The focus controlling system of claim 16, wherein the resolution index comprises a modulation transfer function (MTF) index.

* * * * *